UNITED STATES PATENT OFFICE.

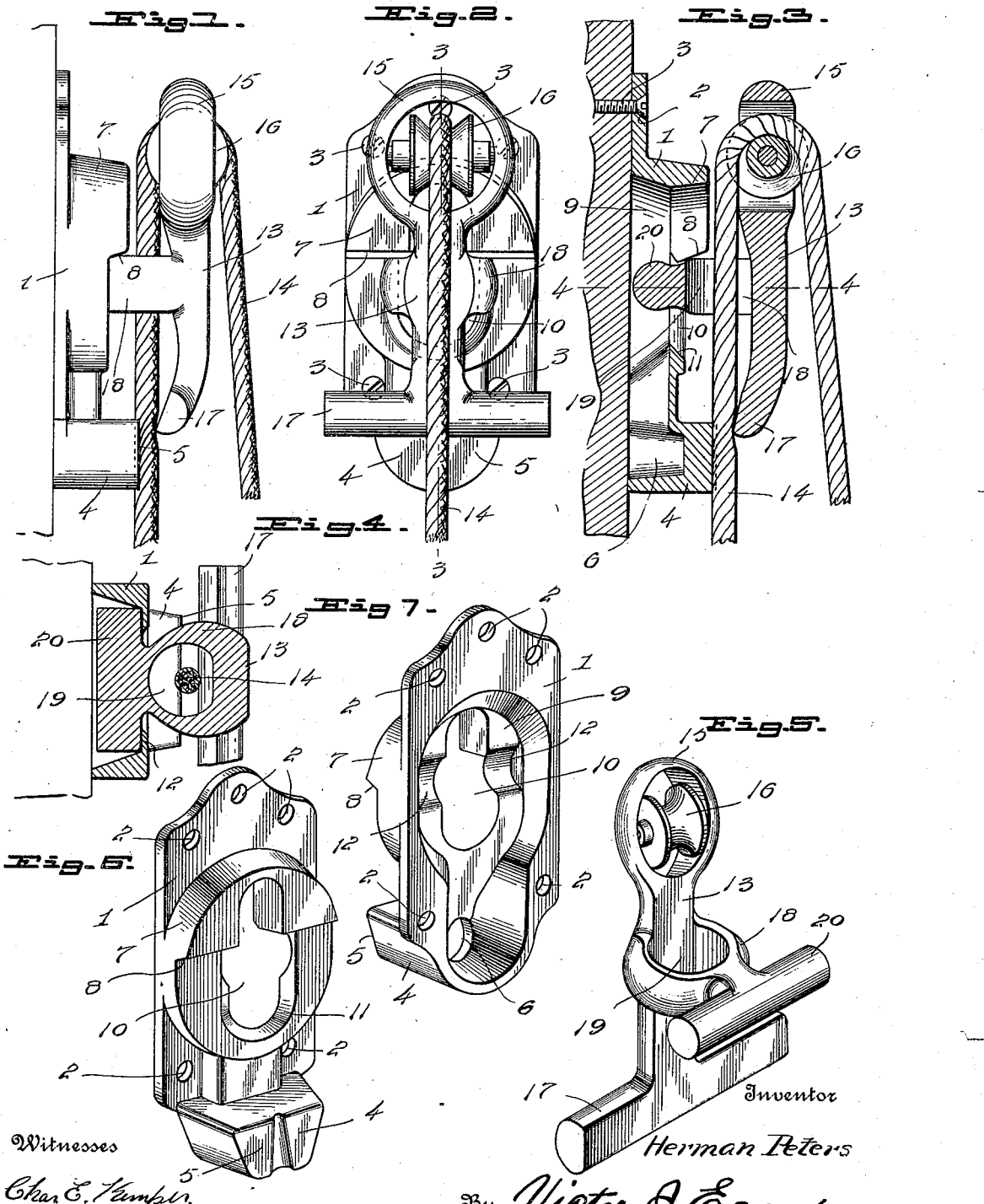

HERMAN PETERS, OF JAMAICA, NEW YORK.

AUTOMATIC LINE CLAMP OR HOLDER.

1,084,476.  Specification of Letters Patent.  Patented Jan. 13, 1914.

Application filed January 14, 1913. Serial No. 742,010.

*To all whom it may concern:*

Be it known that I, HERMAN PETERS, a citizen of the United States, residing at Jamaica, Long Island, in the county of Queens and State of New York, have invented new and useful Improvements in Automatic Line Clamps or Holders, of which the following is a specification.

This invention relates to an automatic line clamp or holder, for use in clamping clothes lines, hoisting ropes or cables, etc., the object of the invention being to provide a device of this character which is simple of construction, inexpensive of production, reliable and efficient in use, and adapted to automatically clamp the line or rope while permitting of its adjustment when occasion requires.

The invention consists of the features of construction, combination and arrangement of parts hereinafter fully described and claimed, reference being had to the accompanying drawings, in which:—

Figure 1 is a side elevation of my improved automatic line holder or clamp as secured to a suitable support. Fig. 2 is a front elevation of the same. Fig. 3 is a vertical longitudinal section on line 3—3 of Fig. 2. Fig. 4 is a vertical transverse section on line 4—4 of Fig. 3. Fig. 5 is a perspective view of the clamping lever. Figs. 6 and 7 are similar views of the bracket.

The device comprises a bracket member 1 adapted to rest against a wall or other support and provided with openings 2 for the passage of suitable fastenings 3 to secure it to said support. At its lower end the bracket is provided with a lug or offset 4 having a grooved clamping face 5, which lug is preferably hollow to provide in its rear face a socket 6.

The central portion of the bracket is formed with an outstanding boss 7, of circular or elliptical form, the upper portion of which projects to a greater extent than the lower portion thereof, to provide abutment shoulders 8. The boss is hollow to form a chamber or concavity 9 on the rear side of the bracket.

As shown the boss 7 is provided with an elongated vertical slot 10, the lower portion of which is wider than the upper portion thereof and formed with a beveled surface 11. This slot 10 communicates with the chamber or concavity 9, which is formed with oppositely disposed transverse bearing recesses or grooves 12.

A lever 13 is provided for coöperation with the bracket to guide and clamp the line 14. This lever is provided at its upper end with a ring or eye 15 in which is journaled a guide pulley 16, and is provided at its lower end with a cross bar or clamping head 17 adapted to clamp the rope or line against the face 5 of the lug 4. At a point intermediate of its ends the lever is formed with a shank or stem 18 extended to provide a guide opening or eye 19 for the portion of the rope extending from the pulley 16 between the clamping members 4 and 17. The shank terminates in a cross piece 20 forming a coupling head to connect the lever with the bracket member and to engage the bearing recesses 12 to pivotally support said lever.

As shown, the rope or line to be clamped passes inwardly over the pulley 16 and thence downwardly between the bracket and lever through the eye 20 and between the clamping face 5 of the clamping lug 4 and the cross bar or clamping head 17, the pull or tension of the line upon the upper end of the lever causing the head 17 to clamp the adjacent portion of the rope firmly and securely against the lug 4. By pressing the upper end of the lever inward said lever may be regulated upon its supporting trunnions to release the line for adjustment whenever occasion requires. As soon, however, as the line is adjusted the weight of the lever causes said lever to drop by gravity to clamping position, while the tension of the line upon its upper end maintains it in such position, so that the line will be clamped firmly against movement of the head 17 and lug 4.

The upward pivotal or releasing movement of the lever is limited by contact with the shank or eye 18 with the shoulders 8, from which it will be apparent that the play of the lever in either direction will be limited. The lever may be released from the bracket for convenience in storage, shipment, etc., by pressing it inwardly and giving it a quarter turn so that the trunnions 20 will be moved out of the recesses 12 and brought into alinement with the slot 10, whereupon by slightly tilting the lever forwardly to dispose the trunnions at an angle the lever may be removed. By reversal of this motion the lever may again be connected with the bracket, as will be readily understood. The outer surface of the eye 19 is of convex form, so that it will ride easily in contact with the beveled surface 11 which will permit the lever to be tilted forward at an angle as and for the purpose above described.

From the foregoing description, taken in connection with the drawings, the construction, mode of operation and advantages of my improved line or rope clamp or holder will be readily understood, and it will be seen that a device of this character is provided which is simple of construction, reliable and efficient in use, adapted to firmly and securely grip the line by the action of gravity and the line tension, and in which the essential parts of the device are capable of ready disconnection for convenience in storage or transit.

I claim:—

A line or rope clamp comprising a bracket having a body portion, a boss at its upper end and a clamping projection at its lower end extending outwardly beyond the plane of the boss, said boss being hollowed out at the rear to form a chamber or cavity and having its upper portion projecting beyond the face of the body portion to provide lateral shoulders, and said boss being formed between said shoulders with a vertical slot widened and provided with beveled walls at its lower portion and transverse bearing recesses in the chamber in line with said lugs and at right angles to the slot, and a clamping lever provided at its lower end with a T-shaped clamping head for coaction with said clamping projection and at its upper end with a guide for the line, said lever being also provided with a central shank extending inwardly therefrom and forming a guide eye for the direct passage of the line between the body portion and lever and having transverse trunnions for pivotal engagement with said bearing recesses, said trunnions being adapted for insertion and outdraw within and from the chamber through the slot by reverse rotary and angular movements of the lever, and the said guide eye of the shank thereof being arranged for coöperation with said shoulders to limit the tilting motion of the lever in one direction.

In testimony whereof I affix my signature in presence of two witnesses.

HERMAN PETERS.

Witnesses:
 GEO. A. BYRNE,
 M. E. LAUGHLIN.